(12) United States Patent
Kobayashi et al.

(10) Patent No.: US 9,751,492 B2
(45) Date of Patent: Sep. 5, 2017

(54) GAS GENERATOR

(71) Applicant: DAICEL CORPORATION, Osaka-shi, Osaka (JP)

(72) Inventors: Tomoharu Kobayashi, Tatsuno (JP); Masayuki Yamazaki, Tatsuno (JP); Kenji Fukumoto, Tatsuno (JP)

(73) Assignee: DAICEL CORPORATION, Osaka (JP)

( * ) Notice: Subject to any disclaimer, the term of this patent is extended or adjusted under 35 U.S.C. 154(b) by 0 days.

(21) Appl. No.: 15/030,420

(22) PCT Filed: Oct. 24, 2014

(86) PCT No.: PCT/JP2014/078294
§ 371 (c)(1),
(2) Date: Apr. 19, 2016

(87) PCT Pub. No.: WO2015/072308
PCT Pub. Date: May 21, 2015

(65) Prior Publication Data
US 2016/0264092 A1    Sep. 15, 2016

(30) Foreign Application Priority Data

Nov. 13, 2013  (JP) ................................. 2013-234599

(51) Int. Cl.
*B60R 21/274*   (2011.01)
*B60R 21/272*   (2006.01)
*F16K 17/40*    (2006.01)
*B60R 21/26*    (2011.01)

(52) U.S. Cl.
CPC .......... *B60R 21/274* (2013.01); *B60R 21/272* (2013.01); *F16K 13/04* (2013.01); *B60R 2021/26029* (2013.01)

(58) Field of Classification Search
CPC ...... B60R 21/272; B60R 21/274; F16K 17/40
USPC ............................................ 137/74; 220/89.4
See application file for complete search history.

(56) References Cited

U.S. PATENT DOCUMENTS

| 5,653,463 A * | 8/1997 | Jeong .................... B60R 21/272 222/5 |
| 6,231,079 B1 | 5/2001 | Perotto et al. |
| 2004/0195812 A1* | 10/2004 | Canterberry .......... B60R 21/272 280/737 |
| 2005/0062272 A1 | 3/2005 | Smith et al. |
| 2006/0202455 A1* | 9/2006 | Matsuda ............... B60R 21/272 280/736 |

FOREIGN PATENT DOCUMENTS

| JP | 9-58394 A | 3/1997 |
| JP | 10-250525 A | 9/1998 |
| JP | 2000-354756 A | 12/2000 |

* cited by examiner

*Primary Examiner* — Kevin Lee
*Assistant Examiner* — P. Macade Nichols
(74) *Attorney, Agent, or Firm* — Birch, Stewart, Kolasch & Birch, LLP

(57) ABSTRACT

The present invention provides a gas generator in which an outer container is formed by a pressurized gas bottle and a gas generation chamber housing, and a closing member closes therebetween, a gas inflow chamber formed with a gas discharge port is provided between a gas generation chamber and a pressurized gas chamber, a partition wall provided with a rupturing member separates the gas inflow chamber from the gas generation chamber.

7 Claims, 5 Drawing Sheets

Before actuation

During actuation

Before actuation

During actuation

GAS GENERATOR

FIELD OF INVENTION

The present invention relates to a gas generator for use in an airbag apparatus, or the like.

DESCRIPTION OF RELATED ART

A gas generator, which uses, as a gas source, a combustion gas from a gas generating agent and a gas such as argon or helium, is used (in US-A No. 2005/0062272).

In the gas generator disclosed in US-A No. 2005/0062272, a gas bottle 14 filled with a pressurized gas is connected to a tubular member 12 storing a pyrotechnic gas generating agent 54 and a gas treatment element 76, and the gas bottle 14 is connected on the gas treatment element 76 side.

The opening of the bottle 14 is closed by a burst disc 84, and an opener 90 for rupturing the burst disk is disposed.

At the time of actuation, combustion gas is first generated from the gas generating agent 54 and then discharged from a gas exit openings 74 after warming up the gas treatment element 76. Part of the combustion gas causes the opener 90 to move in the axial direction.

The burst disc 84 is then ruptured by a needle 94 of the opener 90, and the pressurized gas flows through a passage formed in a central portion of the opener 90 to be discharged from the gas exit openings 74. In this process, as a result of the pressurized gas passing through the warmed-up gas treatment element 76, the decomposition of $N_2O$, which is a pressurized gas component, is enhanced.

Structurally in the gas generator disclosed in US-A No. 2005/0062272, the combustion gas first passes through and warms up the gas treatment element 76 before being discharged from the gas exit openings 74, and the pressurized gas later passes through the gas treatment element 76 to be warmed up before being discharged from the gas exit openings 74.

SUMMARY OF INVENTION

The present invention provides a gas generator including:
an outer container formed by a pressurized gas bottle, which forms a pressurized gas chamber filled with a pressurized gas, and a cylindrical gas generation chamber housing;
a closing member closing between the pressurized gas bottle and the gas generation chamber housing;
the gas generation chamber housing having
a gas generation chamber accommodating therein an ignition device and a gas generating agent,
a gas inflow chamber, arranged between the pressurized gas chamber and the gas generation chamber for introducing a combustion gas flowing out of the gas generation chamber and a pressurized gas flowing out of the pressurized gas chamber,
a partition wall separating the gas generation chamber from the gas inflow chamber and being provided with a rupturing member for breaking through the closing member;
the gas inflow chamber having
a gas discharge port, and
a step portion or a protrusion formed on the side of the gas generation chamber relative to the position where the gas discharge port is formed;
the partition wall
having a communication hole that makes communication between the gas generation chamber and the gas inflow chamber,
having an outer circumferential edge surface abutting against an inner circumferential wall surface of the outer container, so as to be movable in the axial direction, and
facing directly the closing member at a distance therefrom;
the rupturing member
having an outer diameter smaller than an inner diameter of an opening closed by the closing member, and
being formed at the partition wall so as to face directly the closing member at a distance therefrom;
at a time of actuation,
the partition wall, provided with the rupturing member, being stopped by the outer circumferential edge surface colliding with the step portion or the protrusion formed in the gas inflow chamber after moving in the axial direction while reducing a volume of the gas inflow chamber, and the rupturing member breaking through the closing member to open a gas discharge path from the pressurized gas chamber to the gas inflow chamber; and
the combustion gas, which is generated from the gas generation chamber, and the pressurized gas, which flows out of the pressurized gas chamber, passing through the gas inflow chamber with the decreased volume and being discharged from the gas discharge port.

BRIEF DESCRIPTION OF THE DRAWINGS

The present invention will become more fully understood from the detailed description given hereinbelow and the accompanying drawings which are given by way of illustration only, and thus are no limitative of the present invention and wherein.

DETAILED DESCRIPTION OF THE INVENTION

Structurally, in the gas generator disclosed in US-A No. 2005/0062272, the combustion gas is first generated and then discharged, and the pressurized gas is discharged later.

In US-A No. 2005/0062272, part of the gas necessary to drive the opener 90 is discharged outside the housing, the gas treatment element 76 is needed for heat exchange, and the gas treatment element 76 needs to be warmed up and the burst disc 84 needs to be broken with the needle 94 of the opener 90, which causes an increase in an amount of the gas generating agent and makes it difficult to downsize the gas generator.

In particular, heat exchange with the gas treatment element 76 is needed to decompose N₂O which is the pressurized gas, and the gas treatment element 76 is essential in US-A No. 2005/0062272.

The present invention provides a gas generator that is downsized because combustion gas and pressurized gas are discharged at the same time through a narrow space.

At the time of actuation, in the gas generator in accordance with the present invention, the partition wall moves, reducing a volume of the gas inflow chamber for introducing the combustion gas and the pressurized gas.

Thereby, even when the combustion gas and the pressurized gas are discharged substantially at the same time, the high-temperature combustion gas and the low-temperature pressurized gas pass through the gas inflow chamber with the decreased volume and are discharged together from the gas discharge port. As a result, the temperature of the discharged gas is greatly reduced without using a coolant for exchanging heat with the gas, no adverse effect is produced on the airbag inflation, and an occupant is not adversely affected by discharged gas with increased temperature.

Any partition wall can be employed as long as it separates the gas generation chamber from the gas inflow chamber and is formed with a communication hole.

Such a partition wall may be formed of a disk, or one provided with a circular bottom surface and an annular wall extending in one direction from the circumferential edge of the circular bottom surface. By adjusting a length of the annular wall, the partition wall can be in a shape of a shallow dish or a deep cup.

When the partition wall is formed of a disk, the communication hole is provided to penetrate the disk in the thickness direction, and a circumferential surface of the disk abuts against the inner circumferential wall surface of the gas generation chamber housing.

When the partition wall has a circular bottom surface and an annular wall extending in one direction from the circumferential edge of the circular bottom surface, the communication hole is formed to penetrate the circular bottom surface in the thickness direction, and the annular wall abuts against the inner circumferential wall surface of the cylindrical gas generation chamber housing. In this case, the annular wall functions as a guide for the moving partition wall.

Since it is possible to adjust a volume of the gas inflow chamber to be a predetermined volume by the partition wall abutting against the step portion and the protrusion formed in the gas inflow chamber, discharge of the combustion gas and the pressurized gas is not inhibited.

Preferably, the step portion is an annular step portion formed by changing the inner diameter of the inner circumferential wall surface of the gas inflow chamber (the gas generation chamber housing).

Preferably, the protrusion is an annular protrusion or a plurality of independent protrusions projecting inward from the inner circumferential wall surface of the gas inflow chamber (the gas generation chamber housing).

The rupturing member formed at the partition wall has an outer diameter smaller than an inner diameter of the opening closed by the closing member, and a gap generated by the difference in the outer diameters between the opening and the rupturing member serves as a pressurized gas discharge path.

The rupturing member formed at the partition wall may be of any material and shape, provided that it breaks and opens the closing member. The rupturing member may be integrally formed with the partition wall or fixed to the partition wall by welding or the like. A fixing location or a fixing method of the closing member is not limited, provided that it is disposed between the pressurized gas bottle and the gas generation chamber housing.

For example, the rupturing member can be formed of stainless steel or iron and be in a shape of a circular column or a polygonal column, and may have a sharpened, spherical, or flat tip.

The preferable aspect 1 of the present invention is the gas generator according to the present invention described above, wherein the partition wall has a cup portion, a flange portion formed at an opening of the cup portion, and an annular wall portion provided vertically from the flange portion, a bottom surface of the cup portion faces directly the closing member at a distance therefrom, and a circumferential surface of the cup portion faces directly the inner circumferential wall surface of the cylindrical gas generation chamber housing at a distance therefrom;

the circumferential surface of the cup portion is provided with the communication hole that makes communication between the gas generation chamber and the gas inflow chamber, and an outer circumferential surface of the annular wall portion abuts against the inner circumferential wall surface of the cylindrical gas generation chamber housing, so as to be movable in the axial direction, and the rupturing member has an outer diameter smaller than the inner diameter of an opening closed by the closing member, and is formed at the bottom surface of the cup portion so as to face directly the closing member at a distance therefrom, at a time of actuation, the partition wall provided with the rupturing member moves in the axial direction while reducing the volume of the gas inflow chamber, and then is stopped by the flange portion of the partition wall abutting against a protrusion formed at the gas inflow chamber, and the rupturing member breaks the closing member, thereby opening a gas discharge path from the pressurized gas chamber to the gas inflow chamber, and the combustion gas which is generated from the gas generation chamber and the pressurized gas which flows out of the pressurized gas chamber pass through the gas inflow chamber with the decreased volume and are discharged from the gas discharge port.

In the preferable aspect 1 of the present invention, only the difference from the present invention in the partition wall is specified.

The partition wall has the annular wall portion provided vertically from the flange portion, and the outer circumferential surface of the annular wall portion abuts against the inner circumferential wall surface of the cylindrical gas generation chamber housing so as to be movable in the axial direction. The annular wall portion functions as a guide when the partition wall moves.

In the gas generator disclosed in US-A No. 2005/0062272, the combustion gas and the pressurized gas flow so as to collide mutually from the opposite directions.

In the gas generator in accordance with the present invention, the combustion gas flows radially out through the communication hole formed in the circumferential surface of the cup portion of the partition wall, and then passes through the gas inflow chamber to be discharged from the gas discharge port. The pressurized gas passes through the opening of the closing member, collides with the bottom surface of the cup portion of the partition wall, changes its flow direction radially, and passes through the gas inflow chamber to be discharged from the gas discharge port.

Therefore, the combustion gas and pressurized gas do not collide mutually from the opposite directions unlike in the gas generator disclosed in US-A No. 2005/0062272.

The preferable aspect 2 of the present invention is the gas generator according to the present invention or the preferable aspect 1 of the present invention described above, wherein the rupturing member fixed to the partition wall has a plurality of grooves formed continuously in a longitudinal direction in a circumferential surface of a columnar body; and when the rupturing member opens the closing member by collision and breaking, the plurality of the grooves serves as the gas discharge path from the pressurized gas chamber to the gas inflow chamber.

The rupturing member has an outer diameter smaller than the inner diameter of the opening closed by the closing member and includes a plurality of grooves formed in the longitudinal direction in the circumferential surface of a columnar body.

The columnar body is in a shape of a column or a rectangular column, and may have a sharpened, spherical, or flat tip.

The columnar body has the plurality of grooves formed in the longitudinal direction in the circumferential surface.

A depth and a number of the grooves are adjusted in accordance with strength of the columnar body serving as the rupturing member for the closing member.

When the rupturing member (the columnar body) breaks the closing member, the pressurized gas in the pressurized gas bottle passes through the grooves present in the circumferential surface and enters the gas inflow chamber.

The preferable aspect 3 of the present invention is the gas generator according to the present invention or the preferred aspect 1 of the present invention described above, wherein the rupturing member fixed to the partition wall is formed of a hollow columnar body;

the hollow columnar body has a first opening formed on a tip side and a second opening formed on a side of the partition wall; and when the rupturing member opens the closing member by collision and breaking, the first opening, the hollow portion and the second opening serve as the gas discharge path from the pressurized gas chamber to the gas inflow chamber.

The rupturing member has an outer diameter smaller than the inner diameter of the opening closed by the closing member. The rupturing member also has a hollow interior and the first opening and second opening formed at different positions.

The columnar body is in a shape of a column or a rectangular column and may have a sharpened, spherical, or flat tip.

The hollow portion of the columnar body is communicated with the outer side by the first opening and the second opening.

A size of the hollow portion of the columnar body is adjusted in accordance with strength of the columnar body serving as the rupturing member for the closing member.

When the rupturing member (the columnar body having the hollow portion) breaks the closing member, the pressurized gas in the pressurized gas bottle enters the hollow portion from the first opening of the columnar body, then exits to the outer side from the second opening and enters the gas inflow chamber.

The preferable aspect 4 of the present invention is the gas generator according to the present invention or any one of the preferable aspects 1 to 3 of the present invention mentioned above, wherein a tip of the rupturing member which faces the closing member is sharpened.

The rupturing member with a sharpened tip can be one having a columnar or rectangular-columnar shape with an arrow tip, one having a columnar or rectangular-columnar shape with a tip cut obliquely in the longitudinal direction, or one having a conical or pyramidal shape.

In the gas generator of the present invention, the combustion gas and the pressurized gas are both used as a gas source, and although containers for storing each of them are needed, a high-temperature combustion gas and a low-temperature pressurized gas are discharged at the same time through a narrow space and no parts are needed for adjusting the gas temperature, and thereby, the gas generator is downsized as compared with a conventional product.

Figure 1:
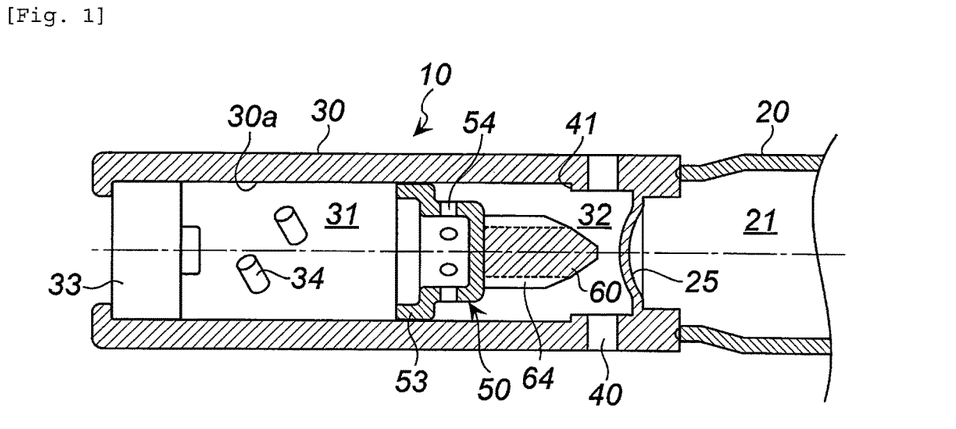
FIG. 1 shows an axial partial sectional view of the gas generator in accordance with the present invention.
Figure 2:
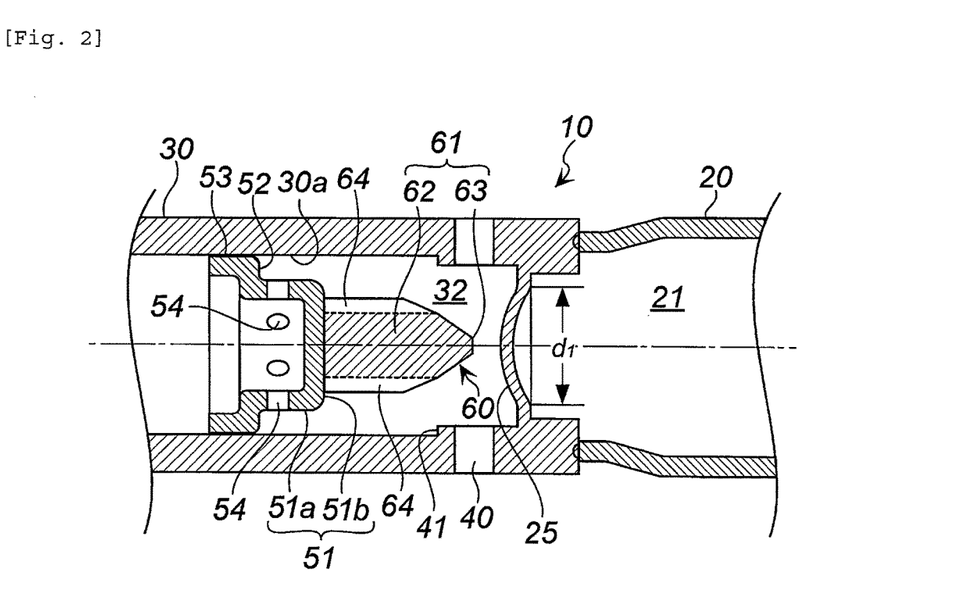
FIG. 2 shows a partial enlarged view of the gas generator depicted in FIG. 1.
Figure 3:
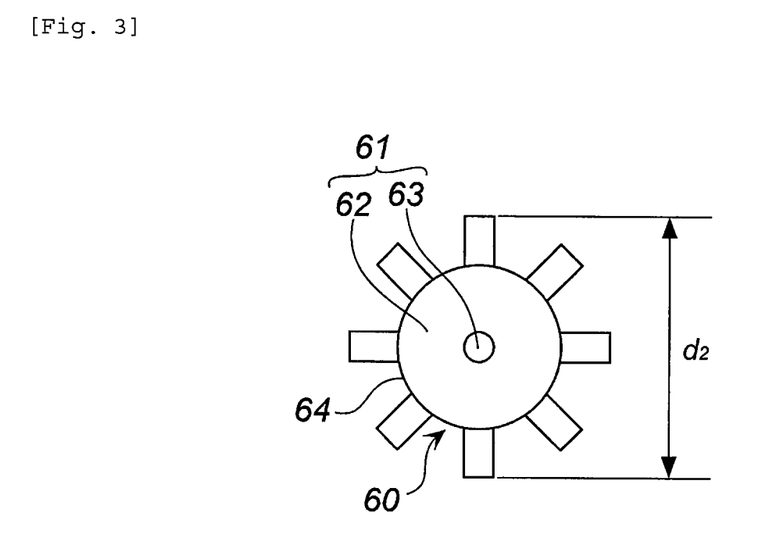
FIG. 3 shows a front view of the rupturing member used in the gas generator depicted in FIGS. 1 and 2.

DESCRIPTION OF EMBODIMENTS (1) Gas Generator Depicted in FIGS. 1 to 3.

A gas generator 10 has a pressurized gas bottle 20 filled with a pressurized gas and a cylindrical gas generation chamber housing 30. The bottle and the housing are made from a metal such as iron and stainless steel.

An interior of the pressurized gas bottle 20 is a pressurized gas chamber 21 filled under a high pressure with a known gas such as argon or helium.

A closing member 25 closes between the pressurized gas bottle 20 and the gas generation chamber housing 30. A fragile portion (a groove, etc.) may be formed in the surface of the closing member 25 on the pressurized gas bottle 20 side.

In the gas generator 10 depicted in FIG. 1, the closing member 25 is fixed to the opening at one end of the gas generation chamber housing 30, but the closing member 25 may be fixed to the opening of the pressurized gas bottle 20.

The closing member 25 is formed of a metallic disk made of iron or stainless steel. As depicted in FIGS. 1 and 2, the closing member is deformed into a bowl-like shape towards the gas generation chamber housing 30 by receiving the pressure inside the pressurized gas chamber 21.

The gas generation chamber housing 30 has a gas generation chamber 31 and a gas inflow chamber 32, and these chambers are separated from each other by a partition wall 50 provided with a rupturing member 60.

An electric igniter 33, which is used in a known gas generator, is fixed to the opening of the gas generation chamber 31 (an opening at the other end of the gas generation chamber housing 30).

The gas generation chamber 31 is charged with a gas generating agent 34 which is used in a known gas generator.

The partition wall 50 has a cup portion 51, a flange portion 52 formed at an opening of the cup portion 51, and an annular wall portion 53 provided vertically at the flange portion 52.

A circumferential surface 51*a* of the cup portion 51 is provided with a plurality of communication holes 54 and faces directly an inner circumferential wall surface 30*a* of the cylindrical gas generation chamber housing 30 at a distance therefrom. A size of the communication holes 54 is such that the gas generating agent 34 does not pass therethrough.

The outer circumferential surface of the annular wall portion 53 abuts against the inner circumferential wall surface 30a of the cylindrical gas generation chamber housing so as to be movable in an axial direction.

The rupturing member 60 has an outer diameter (d2) smaller than an inner diameter (d1) of the opening closed by the closing member 25, the outer diameter d2 is smaller than the outer diameter of a bottom surface 51b (a circumferential surface 51a). The rupturing member protrudes from the bottom surface 51b towards the closing member 25.

The rupturing member 60 is fixed to the bottom surface 51b of the cup portion 51 so as to face directly the closing member 25 at a distance therefrom.

The rupturing member 60 is formed by a columnar body 61.

The columnar body 61 has a plurality of grooves 64 formed continuously in the longitudinal direction in the circumferential surface 62, and a tip 63 of the columnar body 61 is sharpened in a conical shape.

The plurality of the grooves 64 serves as a gas discharge path from the pressurized gas bottle 20 (the pressurized gas chamber 21) to the gas inflow chamber 32 when the rupturing member 60 opens the closing member 25 by colliding with and breaking through the closing member 25.

The gas inflow chamber 32 is a space between the closing member 25 and the partition wall 50 before the actuation, and the combustion gas flowing out of the gas generation chamber 31 and the pressurized gas flowing out of the pressurized gas bottle 20 (the pressurized gas chamber 21) flow into this space.

A plurality of gas discharge ports 40 is formed in the gas generation chamber housing 30 facing the gas inflow chamber 32. Before the actuation, the gas discharge ports 40 are closed from the inside with an aluminum tape or the like.

In the gas inflow chamber 32, an annular step portion 41 is formed by reducing the inner diameter of the gas generation chamber housing 30 formed on the side of the gas generation chamber 31 relative to the position where the gas discharge port 40 is formed.

Figure 4:
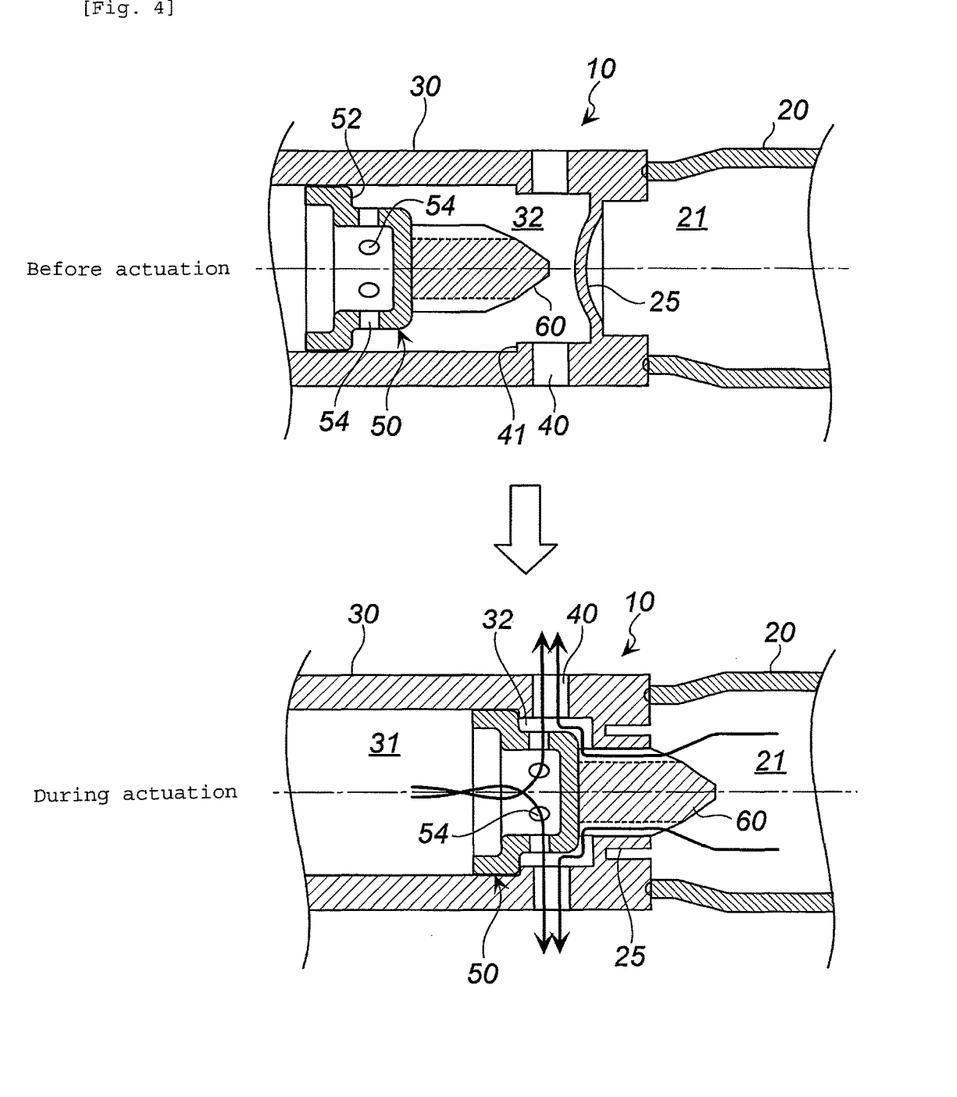
FIG. 4 shows a partial sectional view for explaining an actuation-induced change in the gas generator depicted in FIGS. 1 and 2.

The operation of the gas generator 10 depicted in FIG. 4 when it is used as an airbag apparatus will be explained hereinbelow.

When the electric igniter 33 is actuated, the gas generating agent 34 in the gas generation chamber 31 is ignited and burned, and the combustion gas is generated.

By the pressure increase in the gas generation chamber 31, the partition wall 50 moves in the axial direction (towards the closing member 25) while reducing a volume of the gas inflow chamber 32, and the movement of the partition wall 50 is stopped when the flange portion 52 abuts against the annular step portion 41.

In this process, the rupturing member 60 breaks and opens the closing member 25, and the discharge path for the pressurized gas in the pressurized gas chamber 21 is opened. At this time, the distal end side of the grooves 64 in the rupturing member 60 is positioned inside the pressurized gas chamber 21, and the opposite end is positioned inside the gas inflow chamber 32.

The pressurized gas flows out from the pressurized gas chamber 21 via the gas discharge path formed by the grooves 64 of the rupturing member 60 and the ruptured closing member 25, the flow direction of the gas is radially changed by collision with the bottom surface 51b of the cup portion of the partition wall 50, and then, the pressurized gas passes through the gas inflow chamber 32 with the decreased volume and is ejected from the gas discharge ports 40.

Meanwhile, the combustion gas in the gas generation chamber 31 flows out from the communication holes 54 of the partition wall 50, passes through the gas inflow chamber 32 with a deceased volume and is ejected from the gas discharge ports 40.

Thus, in the gas generator 10, the high-temperature combustion gas and the low-temperature pressurized gas are discharged from the gas discharge ports 40 after passing together through the gas inflow chamber 32 with the decreased volume. Thereby, the temperature of the discharged gas is maintained such that the airbag is sufficiently inflated and no adverse effect is produced on an occupant.

As a result, the gas treatment element 76 used in the gas generator disclosed in US-A No. 2005/0062272 is not needed, and therefore a large space for installment thereof is not needed. In addition, an amount of the combustion gas required to warm up the gas treatment element 76 is not needed and an amount of the gas generating agent is reduced, thereby making it possible to downsize the gas generator.

Further, since the partition wall 50 is arranged at a position closer to the gas generation chamber 31 than to the gas discharge ports 40, the partition wall 50 is moved efficiently by the combustion gas generated in the gas generation chamber 31. Therefore, reliable actuation is obtained unlike US-A No. 2005/0062272 in which part of combustion gas is discharged from exit openings 74 before an opener 90 is moved.

Figure 5:
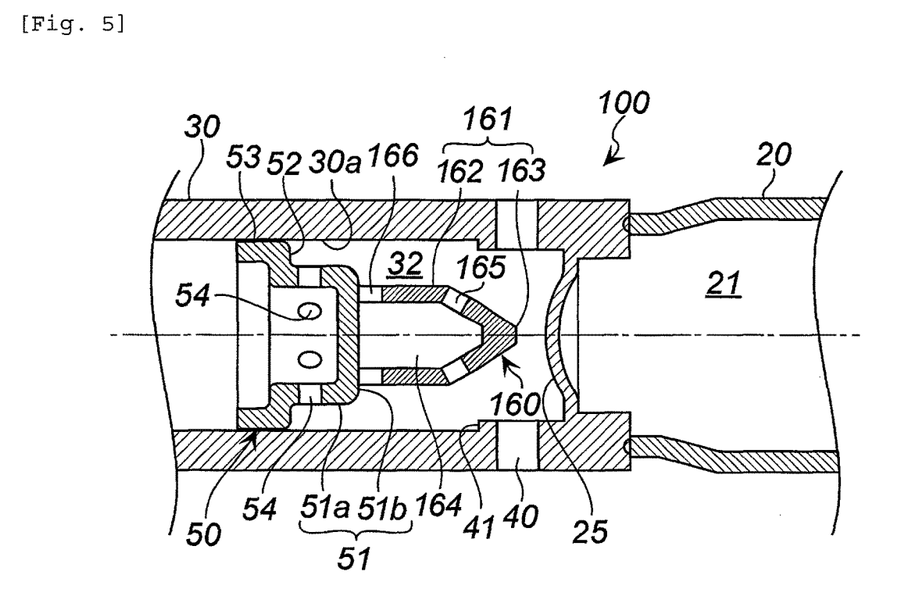
FIG. 5 shows a partial sectional view in the axial direction, of the gas generator of another embodiment.

(2) Gas Generator Depicted in FIG. 5

A gas generator depicted in FIG. 100 is the same as the gas generator 10 depicted in FIGS. 1 and 2, except that a rupturing member 160 fixed to the partition wall 50 is different.

The rupturing member 160 has an outer diameter (the outer diameter of the same size as d2 in FIG. 3) smaller than the inner diameter (d1) of the opening closed by the closing member 25.

The rupturing member 160 is fixed to the bottom surface 51b of the cup portion 51 so as to directly face the closing member 25 at a distance therefrom.

The rupturing member 160 is formed of a hollow columnar body 161, and a tip 163 thereof is of a truncated cone shape.

The hollow columnar body 161 has a first opening 165 formed in a circumferential surface 162 near the tip 163 and a second opening 166 formed in the circumferential surface 162 near the bottom surface 51b. The inside of the columnar body 161 corresponds to a hollow portion 164.

When the rupturing member 160 collides with and breaks through the closing member 25 to open the closing member, a combination of the first opening 165, the hollow portion 164 and the second opening 166 forms a gas discharge path from the pressurized gas bottle 20 (the pressurized gas chamber 21) to the gas inflow chamber 32.

The operation of the gas generator 100 when it is used as an airbag apparatus will be explained hereinbelow with reference to FIGS. 1 and 6.

When the electric igniter 33 is actuated, the gas generating agent 34 in the gas generation chamber 31 is ignited and burned and the combustion gas is generated.

By the pressure increase in the gas generation chamber 31, the partition wall 50 moves in the axial direction while reducing the volume of the gas inflow chamber 32, and the movement of the partition wall 50 is stopped when the flange portion 52 abuts against the annular step portion 41.

In the process of the movement of the partition wall, the rupturing member 160 breaks through and opens the closing member 25, and the gas discharge path for the pressurized gas in the pressurized gas chamber 21 is opened. At this time, the first opening 165 of the rupturing member 160 is positioned inside the pressurized gas chamber 21, and the second opening 166 is positioned inside the gas inflow chamber 32.

The pressurized gas enters the hollow portion 164 from the first opening 165 of the rupturing member 160, passes through the second opening 166 from the hollow portion 164, then enters the gas inflow chamber 32 with the decreased volume, and is ejected from the gas discharge ports 40. Meanwhile, the combustion gas in the gas generation chamber 31 flows out from the communication holes 54 of the partition wall 50, passes through the gas inflow chamber 32 with the decreased volume, and is ejected from the gas discharge ports 40.

Thus, in the gas generator 100, the high-temperature combustion gas and the low-temperature pressurized gas are discharged from the gas discharge ports 40 after passing together through the gas inflow chamber 32 with the decreased volume. Thereby, a temperature of the discharged gas is maintained such that the airbag is sufficiently inflated and no adverse effect is produced on an occupant.

As a result, the gas treatment element 76 used in the gas generator disclosed in US-A No. 2005/0062272 is not needed, and therefore a large space for installment thereof is not needed. In addition, an amount of the combustion gas required to warm up the gas treatment element 76 is not needed and thereby, an amount of the gas generating agent is reduced. Therefore, the gas generator is downsized.

Further, since the partition wall 50 is arranged at a position closer to the gas generation chamber 31 than to the gas discharge ports 40, the partition wall 50 is efficiently moved by the combustion gas generated in the gas generation chamber 31.

Figure 6:
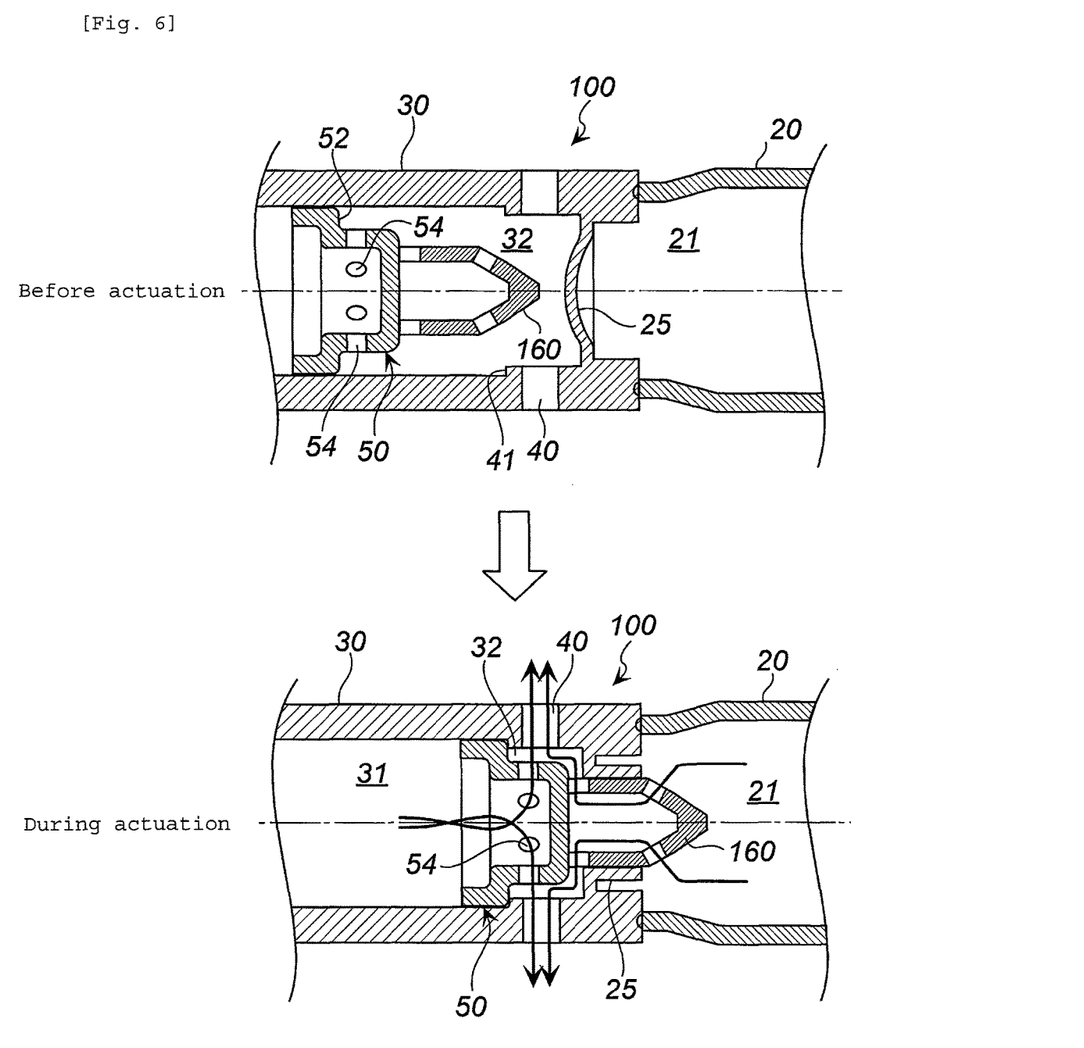
FIG. 6 shows a partial sectional view for explanting an actuation-induced change in the gas generator depicted in FIG. 5.

In the embodiments depicted in FIGS. 5 and 6, such a member may be used as the rupturing member 160 with an obliquely cut-off tip of a cylinder, in which an opening of the tip corresponds to the first opening, the interior of the cylinder corresponds to the hollow portion and the second opening is formed on the bottom surface 51 side.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator, comprising:
an outer container formed by a pressurized gas bottle, which forms a pressurized gas chamber filled with a pressurized gas, and a cylindrical gas generation chamber housing;
a closing member closing between the pressurized gas bottle and the gas generation chamber housing;
the gas generation chamber housing having,
  a gas generation chamber accommodating therein an ignition device and a gas generating agent,
  a gas inflow chamber, arranged between the pressurized gas chamber and the gas generation chamber for introducing a combustion gas flowing out of the gas generation chamber and a pressurized gas flowing out of the pressurized gas chamber, and
  a partition wall separating the gas generation chamber from the gas inflow chamber and being provided with a rupturing member for breaking through the closing member;
the gas inflow chamber having
  a gas discharge port, and
  a step portion or a protrusion formed on a side of the gas generation chamber housing between the gas generation chamber and the gas discharge port,
the partition wall,
  having a communication hole that communicates between the gas generation chamber and the gas inflow chamber,
  having an outer circumferential edge surface abutting against an inner circumferential wall surface of the outer container, so as to be movable in an axial direction, and
  facing directly the closing member at a distance therefrom;
the rupturing member,
  having an outer diameter smaller than an inner diameter of an opening closed by the closing member, and
  being formed at the partition wall so as to face directly the closing member at a distance therefrom;
at a time of actuation,
the partition wall, provided with the rupturing member, being stopped by the outer circumferential edge surface thereof colliding with the step portion or the protrusion formed in the gas inflow chamber after moving in the axial direction while reducing a volume of the gas inflow chamber, and the rupturing member breaking through the closing member to open a gas discharge path from the pressurized gas chamber to the gas inflow chamber; and
the combustion gas which is generated from the gas generation chamber and the pressurized gas which flows out of the pressurized gas chamber, passing through the gas inflow chamber with the decreased volume and being discharged from the gas discharge port.

2. The gas generator according to claim 1, wherein
the partition wall has a cup portion, a flange portion formed at an opening of the cup portion, and an annular wall portion provided vertically from the flange portion,
a bottom surface of the cup portion faces directly the closing member at a distance therefrom, and a circumferential surface of the cup portion faces directly the inner circumferential wall surface of the cylindrical gas generation chamber housing at a distance therefrom,
the circumferential surface of the cup portion is provided with a communication hole that communicates between the gas generation chamber and the gas inflow chamber, and
an outer circumferential surface of the annular wall portion abuts against the inner circumferential wall surface of the cylindrical gas generation chamber housing, so as to be movable in the axial direction, and
the rupturing member has an outer diameter smaller than the inner diameter of the opening closed by the closing member, and is formed at the bottom surface of the cup portion so as to face directly the closing member at the distance therefrom,
at the time of actuation,
the partition wall provided with the rupturing member moves in the axial direction while reducing the volume of the gas inflow chamber, and then is stopped by the flange portion of the partition wall abutting against the protrusion formed at the gas inflow chamber, and the rupturing member breaks the closing member, thereby opening the gas discharge path from the pressurized gas chamber to the gas inflow chamber; and the combustion gas which is generated from the gas generation chamber and the pressurized gas which flows out of the pressurized gas chamber, pass through the gas inflow chamber with the decreased volume and are discharged from the gas discharge port.

3. The gas generator according to claim 1, wherein
the rupturing member fixed to the partition wall has a plurality of grooves formed continuously in a longitudinal direction in a circumferential surface of a columnar body; and
when the rupturing member opens the closing member by collision and breaking, the plurality of the grooves serves as the gas discharge path from the pressurized gas chamber to the gas inflow chamber.

4. The gas generator according to claim 1, wherein
the rupturing member fixed to the partition wall is formed of a hollow columnar body;
the hollow columnar body has a first opening formed on a tip side and a second opening formed on a side of the partition wall; and
when the rupturing member opens the closing member by collision and breaking, the first opening, the hollow portion and the second opening serve as the gas discharge path from the pressurized gas chamber to the gas inflow chamber.

5. The gas generator according to claim 1, wherein
a tip of the rupturing member which faces the closing member is sharpened.

6. A gas generator, comprising:
an outer container formed by a pressurized gas bottle, which forms a pressurized gas chamber filled with a pressurized gas, and a cylindrical gas generation chamber housing;
a closing member closing between the pressurized gas bottle and the gas generation chamber housing;
the gas generation chamber housing having,
    a gas generation chamber accommodating therein an ignition device and a gas generating agent,
    a gas inflow chamber, arranged between the pressurized gas chamber and the gas generation chamber for introducing a combustion gas flowing out of the gas generation chamber and pressurized gas flowing out of the pressurized gas chamber, and
    a partition wall separating the gas generation chamber from the gas inflow chamber and being provided with a rupturing member for breaking through the closing member;
the gas inflow chamber having,
    a gas discharge port, and
    a step portion or a protrusion between the gas generation chamber and said gas discharge port;
the partition wall,
    having a communication hole communicates between the gas generation chamber and the gas inflow chamber,
    having an outer circumferential edge surface abutting against an inner circumferential wall surface of the outer container, so as to be movable in an axial direction, and
    facing directly the closing member at a distance therefrom;
the rupture member,
    having an outer diameter smaller than an inner diameter of an opening closed by the closing member, and
    being formed at the partition wall so as to face directly the closing member at a distance therefrom.

7. The gas generation according to claim 6, wherein
the partition wall has a cup portion, a flange portion formed at an opening of the cup portion, and an annular wall portion provided vertically from the flange portion, a bottom surface of the cup portion faces directly the closing member at a distance therefrom, and a circumferential surface of the cup portion faces directly the inner circumferential wall surface of the cylindrical gas generation chamber housing at a distance therefrom,
the circumferential surface of the cup portion is provided with the communication hole, and
an outer circumferential surface of the annular wall portion abuts against the inner circumferential wall surface of the cylindrical gas generation chamber housing, and
the rupturing member is formed at the bottom surface of the cup portion.

* * * * *